Aug. 17, 1948.  A. R. MADSEN  2,447,075
SIGNAL AND DANGER FLAG
Filed June 26, 1947  2 Sheets-Sheet 1
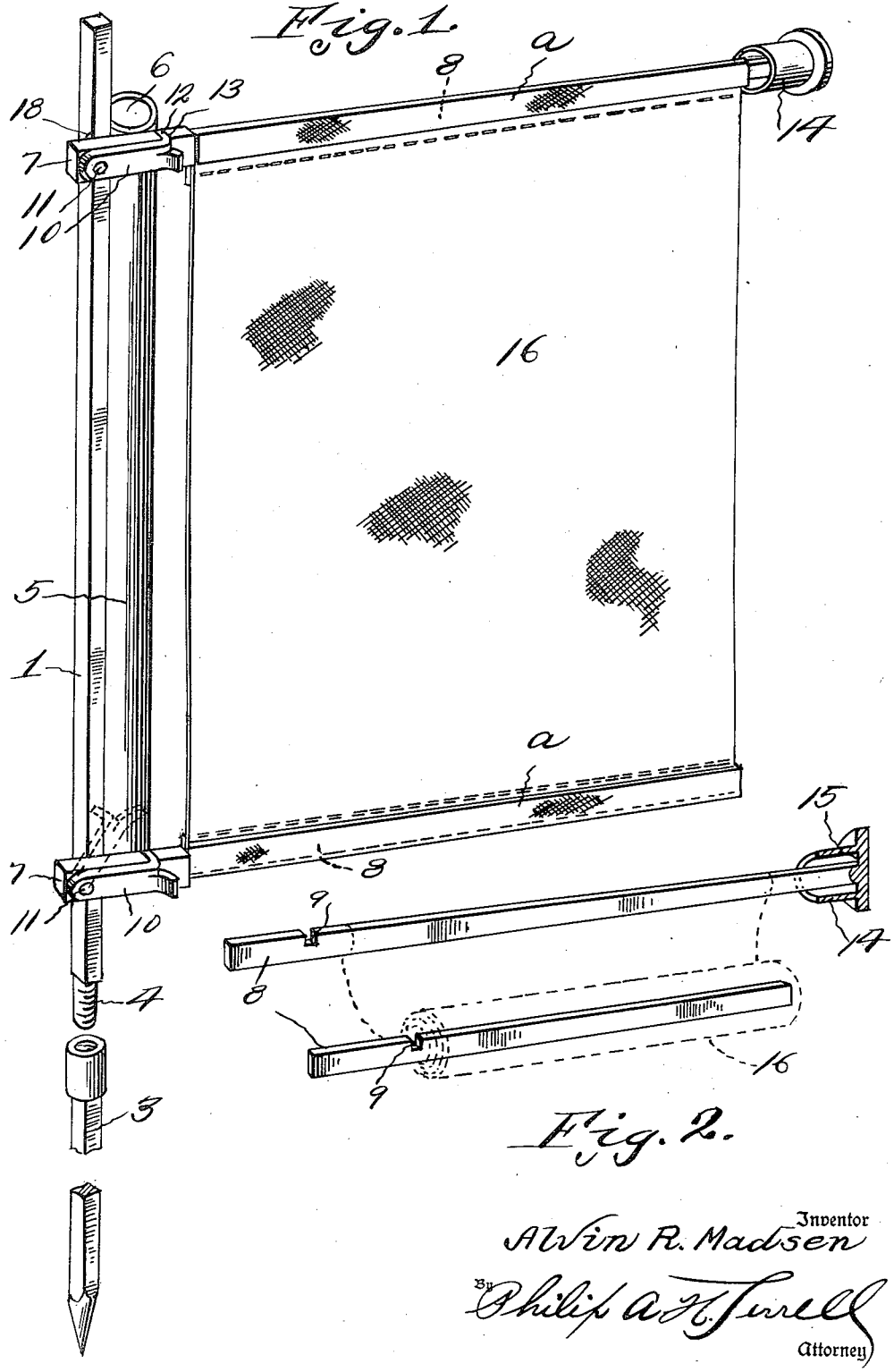

Aug. 17, 1948. A. R. MADSEN 2,447,075
SIGNAL AND DANGER FLAG
Filed June 26, 1947 2 Sheets-Sheet 2

Inventor
Alvin R. Madsen
By Philip A. H. Terrell
Attorney

Patented Aug. 17, 1948

2,447,075

UNITED STATES PATENT OFFICE 2,447,075

SIGNAL AND DANGER FLAG

Alvin R. Madsen, Rupert, Idaho, assignor of one-half to Raymond E. Messler, Boise, Idaho Application June 26, 1947, Serial No. 757,168

1 Claim. (Cl. 116—173)

The invention relates to signal and danger flags, adapted to be used on trucks and other vehicles, and has for its object to provide a device of this kind wherein the flag is rigidly stretched by spaced bars, detachably connected to a stake or support, and provided with a tubular chambered member, in which member, the flag, when not in use, may be stored when rolled into a compact package.

A further object is to provide the support with spaced sleeves for the reception of the inner ends of the flag carrying bars and latching means carried by said sleeves and cooperating with the inner ends of the flag stretching bars for positively holding the bars against displacement, and the danger flag stretched and in a vertical plane.

A further object is to provide the support with means whereby the flag may be attached directly to the vehicle, or provided with a stake, which stake may be forced into the ground, at a distance behind a truck, when broken down or parked on the road side, to act as a warning to approaching vehicles.

With the above and other objects in view the invention resides in the combination and arrangement of parts as hereinafter set forth, shown in the drawing, described and claimed, it being understood that changes in the precise embodiment of the invention may be made within the scope of the invention without departing from the claim.

In the drawings:

Figure 1 is a perspective view of the danger flag, showing the same in condition for use.

Figure 2 is a perspective view of the flag stretching bars and the body of the flag being rolled thereon, preparatory to storage in the chambered body.

Figure 3:
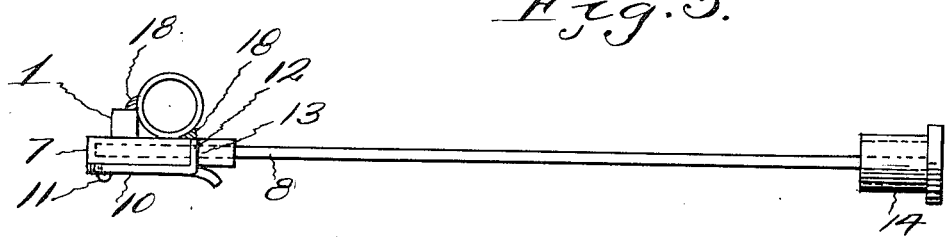
Figure 3 is a top plan view of the flag.
Figure 6:
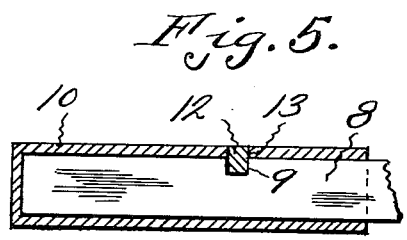
Figure 6 is a perspective view of the cap for the open end of the chambered member.

Referring to the drawings, the numeral I designates the supporting rod, preferably rectangularly shaped as shown, so it can be clamped, by means of U-shaped brackets 2 to the body of a vehicle. When it is desired to place the flag to the rear of the vehicle, to warn approaching vehicles, a pointed stake 3 may be threaded onto the threaded end 4, carried by the lower end of the member I. Disposed to one side of the member I is a tubular flag receiving receptacle 5 having its upper end open, at 6, for the reception of the flag for storage purposes.

Figure 4:
Figure 4 is a vertical transverse sectional view through the chambered body, showing the flag stored therein.
Figure 5:
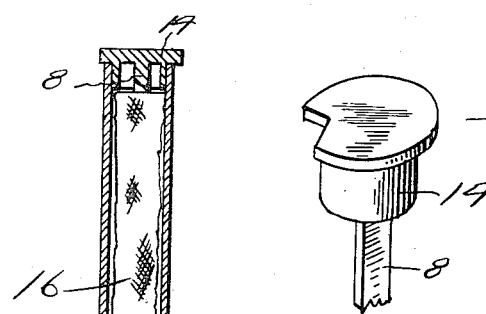
Figure 5 is a vertical longitudinal sectional view through one of the bar receiving sleeves.
Figure 7:
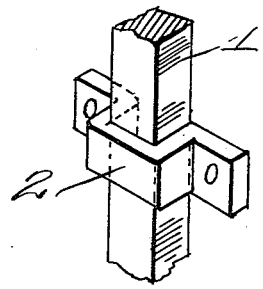
Figure 7 is a detail perspective view of a clamping means for securing the danger flag to a portion of the vehicle body.

Extending transversely of members I and 5 are arm supporting sleeves 7, which sleeves receive the horizontally disposed flag stretching and supporting bars 8, as shown in Figure 1. The inner ends of bars 8 are provided with notches 9 in their upper edges, and the bars are rigidly held in place by pivoted latches 10, pivoted at 11 to the outer faces of the sleeves 7. Latches 10, adjacent their free ends, terminate in transverse lugs 12, which pass through transverse slots 13 in the upper sides of the sleeves 7, and into the notches 9 of the arms 8, therefore it will be seen that the bars 8 are rigidly and detachably supported. The upper bar 8, at its outer end, extends into a closure cap 14, and is welded or otherwise secured therein at 15. Closure cap 14, when the device is collapsed, forms a closure for the upper end of the tubular storage member 5, as shown in Figure 4.

Assuming the flag is in the condition shown in Figure 1, and it is desired to form the same into a compact package for storage and shipment purposes, the latches 10 are hinged upwardly and the bars 8 pulled outwardly. After this operation the flag body 16 is rolled onto both bars 8 and then the package so formed is inserted into the open upper end of the chambered body 5, and the closure cap 14 forced downwardly into the open end 6, hence it will be seen that the flag is protected from damage at all times and is readily accessible for use.

The lower end of the tubular member 6 is provided with a drainage opening 17 so that any water, that may pass into the upper end of the member 5, will drain therefrom.

Sleeves 7, chambered member 5, and supporting rod I are preferably welded together as shown at 18, however applicant does not limit himself in this respect, as it is obvious other assembly methods may be used.

The flag 16 is preferably red and may be made of any kind of pliable or flexible material, however it is preferably provided with luminous material along its upper and lower edges as shown at $a$ so it can be easily and quickly observed at night. The flag may also be provided with a legend, for instance "stop" or "danger," and these legends may be luminous if desired.

From the above it will be seen that a danger signal is provided, particularly adapted for use in connection with vehicles, one that is simple in construction, the parts reduced to a minimum, and one which may be easily and quickly formed into a compact package for shipment or storage purposes. Although applicant has described his device being adapted for use in connection with vehicles, it is obvious it may be used by highway construction crews, or any other place where a danger or flag signal is desirable.

The invention having been set forth what is claimed as new and useful is:

A signal flag storage and display support comprising a vertical stake adapted to be driven into the ground, a chambered tubular member to one side of said stake in parallel relation thereto and rigidly attached thereto, one side of the stake being in the plane of one side of the tubular member, horizontally disposed sleeves connecting the stake and chambered member adjacent their upper and lower ends, flag stretching arms detachably held in said sleeves in a horizontal position and to which arms the upper and lower ends of a signal flag are secured, one of said arms having a closure cap for the upper end of the chambered member, said flag being adapted to be rolled onto one of the arms so that the other arm will assume a position close thereto and a compactness of a size whereby the arms and flag may be received within the chambered member, and the cap close the upper end of the chambered member, said means for detachably holding the stretching arms in the sleeves comprising latches pivoted to the outer faces of the sleeves and swingable in a vertical plane, said latches having arms in the plane of the sleeves and cooperating with notches in the stretching arms through notches in the upper sides of the sleeves.

ALVIN R. MADSEN.

REFERENCES CITED

The following references are of record in the file of this patent:

UNITED STATES PATENTS

| Number | Name | Date |
|---|---|---|
| 483,420 | Brown | Sept. 27, 1892 |
| 695,663 | Weirich | Mar. 18, 1902 |
| 1,002,260 | Golden | Sept. 5, 1911 |
| 1,871,667 | Dalton | Aug. 16, 1932 |
| 2,072,573 | Vigliotti | Mar. 2, 1937 |